United States Patent [19]

Heubusch

[11] 4,432,808
[45] Feb. 21, 1984

[54] TREATMENT OF STAINLESS STEEL APPARATUS USED IN THE MANUFACTURE, TRANSPORT OR STORAGE OF NITROGEN OXIDES

[75] Inventor: Henry P. Heubusch, Buffalo, N.Y.

[73] Assignee: Textron Inc., Providence, R.I.

[21] Appl. No.: 382,112

[22] Filed: May 26, 1982

[51] Int. Cl.³ .............................................. C23G 1/02
[52] U.S. Cl. ........................................ 134/3; 134/21; 134/28; 134/29; 134/41
[58] Field of Search .................... 134/3, 21, 26, 28, 29, 134/81

[56] References Cited

U.S. PATENT DOCUMENTS

| | | | |
|---|---|---|---|
| 2,992,945 | 7/1961 | Geld et al. | 134/22 |
| 3,270,860 | 9/1966 | Siebach | 134/26 X |
| 3,380,921 | 4/1968 | Goodspeed et al. | 134/28 X |
| 3,401,061 | 9/1968 | Watanabe | 134/22 |
| 3,510,432 | 5/1970 | Squire | 252/146 |
| 3,522,093 | 7/1970 | Woolman | 134/22 |
| 3,553,016 | 1/1971 | Foelsch | 134/3 |
| 3,598,741 | 8/1971 | Kanno | 252/79.3 |
| 3,799,803 | 3/1974 | Kraus et al. | 134/26 X |
| 3,880,681 | 4/1975 | Sifre et al. | 134/28 X |

FOREIGN PATENT DOCUMENTS 2601017  7/1977  Fed. Rep. of Germany .......... 134/3

OTHER PUBLICATIONS

"Flow Decay" by C. C. Addison, Dept. of Inorganic Chemistry, The University, Nottingham NG7 2RD, Contract FG1052-70-C-0035, Jun. 30, 1972, pp. 101, 103, 104, 115, 117, 122, 124, 126, 132, 133, 135, 136, 139, AFRPL-TR-72-84.

Primary Examiner—Arthur D. Kellogg
Attorney, Agent, or Firm—Bean, Kauffman & Bean

[57] ABSTRACT

A process is disclosed for cleaning and passivating stainless steel apparatus used in the manufacture, transport, storage and/or use of nitrogen oxides. The process involves sequentially treating stainless steel surfaces of apparatus which contact a nitrogen oxide, with various solutions, in such manner as to enable the apparatus to substantially maintain the quality of the nitrogen oxide to be manufactured, transported, stored and/or used therein. Thus, for example, the purity of nitrogen tetroxide, used as a propellant for rocket engines and the like, may be maintained longer, the shelf life significantly increased and rocket engine flow decay problems markedly reduced through use of the disclosed cleaning and passivating process.

17 Claims, 1 Drawing Figure

TREATMENT OF STAINLESS STEEL APPARATUS USED IN THE MANUFACTURE, TRANSPORT OR STORAGE OF NITROGEN OXIDES

BACKGROUND OF THE INVENTION

It is well known that there is a need for maintaining the purity of various of the nitrogen oxides for critical uses in many high technology industries. Nitrogen forms a multiple of oxides which readily attack the iron-containing metals of the apparatus typically used in their manufacture, transport and/or storage, thus creating significant problems when the maintainence of a desired level of purity is required. For example, it is well known that need exists for the supply of highly pure grades of nitrogen tetroxide propellants for use as oxidizers for rocket engines during system design and development tests, at the launching sites of vehicles to be projected into space and in orbit, such as satellites, space shuttles, or the like. Propellant supply/oxidizer flow rate decay problems associated with impure propellant such as are prone to interfere with design/testing programs and launch scheduling of the vehicle, as well as its space flight life duration prospects have plagued the industry. For example, the publication "Flow Decay", pages 101, 103, 104, 115, 117, 122, 124, 126, 132, 133, 135, 136, and 139 of Final Scientific Report, June 30, 1972, AFRPL-TR-72-84 reports on various problems within the current state of the art.

Such problems are now of major concern due to the recent emergence of nitrogen tetroxide propellants as major oxidizers for liquid propellant rocket engines and occur in connection with the storing, transferring, testing, launching and maneuvering operations of satellites, MX missiles, space shuttles and the like. These problems are caused by the tendency of such oxidizers to corrode their storage, transport and transfer containers, as well as other iron-containing metal parts of the engine oxidizer supply system. Commercially available nitrogen tetroxide propellants are supplied to the test site or launch pad mounted vehicle, either into the vehicle inboard supply tanks or into close-by "ready storage" ground-based intermediary relay tanks. The tanks, piping, valves, etc., components furnished by manufacturers are typically made of stainless steel alloys and are invariably surface-coated by potentially contaminating materials such as metallic oxides and salts, as well as manufacturing residues such as oils, greases, grime, bits of metal and shop dirt. Unless such contaminants are initially completely removed from such components of the system, upon introduction of nitrogen tetroxide therein, undesired chemical reactions are fostered and contaminants are loosened and freed to enter the nitrogen tetroxide supply in suspension. Such materials in suspension tend to plug the filters and other components by way of example in a rocket engine propulsion system, such as the valves and injection orifices; thereby seriously interfering with the propellant transfer operations as well as the test or vehicle launching operations. Furthermore, and perhaps more importantly, the incidence thereof seriously reduces the reliable duration prospect of the rocket engine performance. Typical pre-storage and transfer/operational ambient temperature conditions contribute to these problems. Regardless of how pure the furnished nitrogen tetroxide may be, its introduction into an improperly prepared system will limit its usefulness.

Previously, various steps were taken to "clean" the components of such systems subsequent to their manufacture, employing well-known agents for removing the residues recognized to be potential contaminants and/or reactants for the nitrogen tetroxides to be handled. However, that state of the art did not qualify to satisfy the needs of present day technologies requiring the use of higher purity nitrogen tetroxide. The present invention is the result of the discovery that a novel combination of chemical agents, applied in a specific sequence, will prepare iron-containing metal components to perform with improved efficacy.

As a result of a professional search conducted with respect to this invention, applicant is aware of U.S. Pat. Nos. 3,522,093; 3,598,741; 3,553,016; 2,992,945; 3,401,061; 3,880,681; and 3,510,432. Each of these references is considered relevant to the subject of cleaning and/or passivating apparatus, but none teach the specific procedures disclosed and claimed herein.

One object of the present invention is to provide new and improved methods for chemically cleaning iron-containing metal surfaces of apparatus which may contact a nitrogen oxide.

Another object of the present invention is to provide a method for chemically cleaning stainless steel surfaces of apparatus used in the manufacture, transportation, storage and/or use of high purity nitrogen oxides.

A further object of the present invention is to provide chemically cleaned stainless steel apparatus which will markedly increase the shelf life of nitrogen oxides manufactured, transported and/or stored therein over that of similar uncleaned apparatus.

A still further object of the present invention is to provide a process for chemically cleaning chromium containing stainless steel apparatus used in the manufacture, transport, and/or storage of nitrogen tetroxide.

These and other objects of the present invention will become apparent to those skilled in the art from a consideration of the following specification and claims.

SUMMARY OF THE INVENTION

Nitrogen combines with oxygen to form a variety of nitrogen oxides all of which generally act as oxidizers. As used within this application the term "nitrogen oxide" refers to Nitric Oxide (NO); Nitrogen Trioxide ($N_2O_3$); Nitrogen Dioxide ($NO_2$); Nitrogen tetroxide ($N_2O_4$); and mixtures thereof. Each of these oxides of nitrogen is generally well known and can be prepared by methods known in the prior art. Each of these oxides of nitrogen is generally used for its oxidizing capability and it is this capability which generally creates the problems associated with maintaining purity and shelf life of the oxide when exposed to iron-containing metal surfaces.

The method of the present invention is a process for cleaning and passivating stainless steel surfaces of apparatus used in the manufacture, transportation and/or storage of nitrogen oxides comprising the steps of:

1. Cleaning said surface by contacting with an alkaline cleaner containing solution to remove fouling deposits and thereafter rinsing with water;
2. Pickling said surface by contacting with an aqueous nitric acid/hydrofluoric acid solution to remove oxides, carbonates and mill scale, and thereafter rinsing with water;
3. Passivating said surface by contacting with nitric acid passivation solution and thereafter rinsing with water;

4. Pickling said surface by contacting with a nitrogen tetroxide solution and thereafter rinsing with water;
5. Cleaning said surface by contacting with a citric acid solution and thereafter rinsing with water;
6. Rinsing said surface with distilled or de-ionized water until said surface is chloride free; and
7. Purging said surface free of liquid with hot nitrogen.

The process of the invention also provides specifically for an alternate step 2a which comprises contacting said surface with an alkaline permanganate solution and thereafter rinsing with water between steps 2 and 3 to remove smut which may be detected at the completion of step 2; and for an alternate step 5a which comprises contacting said surface with a nitric acid solution and water rinse between steps 5 and 6 to remove smut which may be detected at the completion of step 5 or successive such treatments in the event smut continues to be detected.

DETAILED DESCRIPTION OF THE INVENTION

Figure 1:
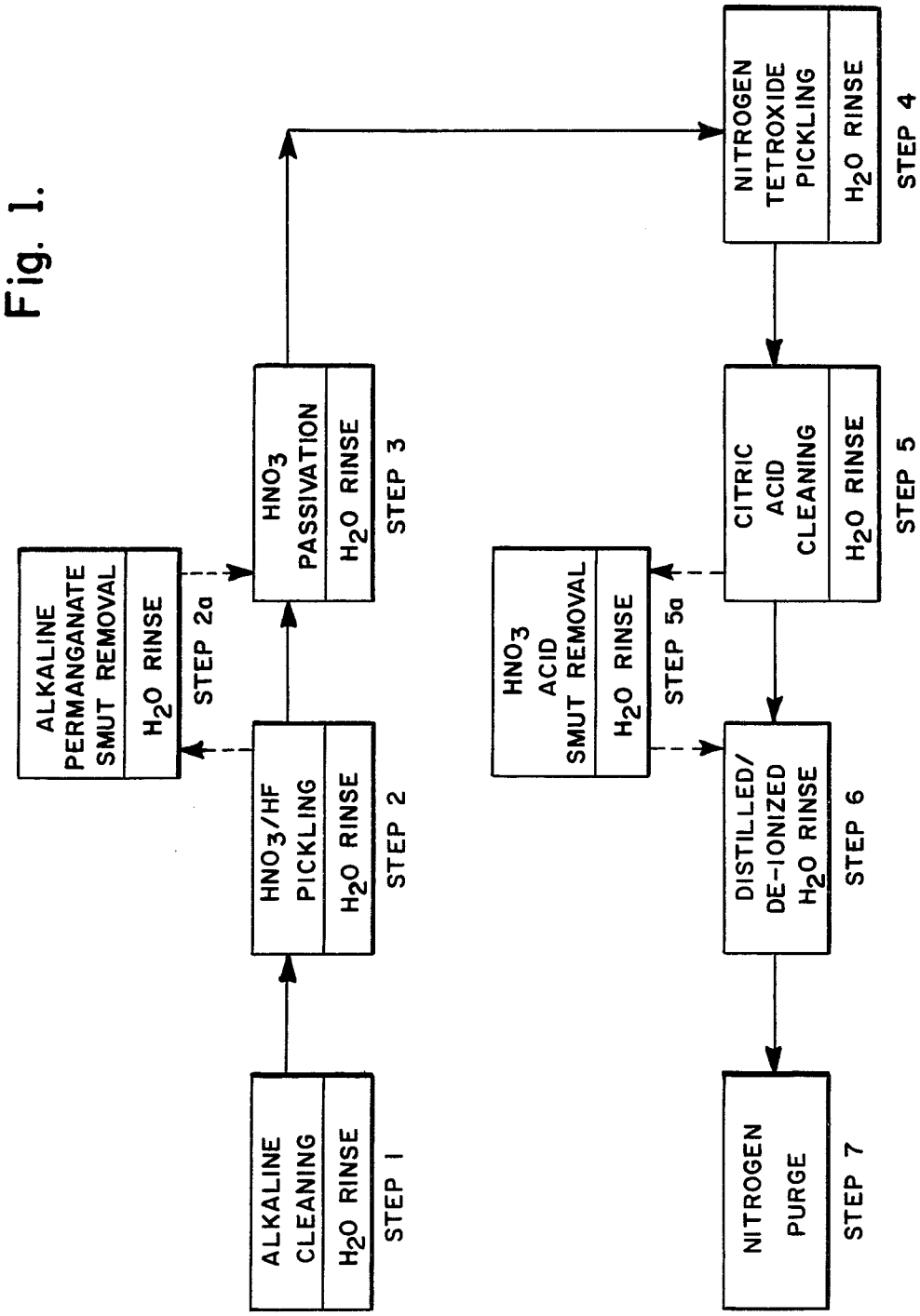
FIG. 1 is a flow diagram illustrating the steps comprising the invention wherein an iron-containing metal surface is contacted with various solutions in accordance with the process of the invention.

Typically, the metal surfaces treated in accord with the process of the invention are the interior surfaces of tanks, reactors, tubing, piping valves and containers of the like through or in which a nitrogen oxide as afore described, is being manufactured, transported and/or stored. Typically such apparatus is made from chromium containing steel alloys particularly various alloys of iron such as stainless steels containing chromium, nickel and/or other components such as manganese and titanium. Typical stainless steels used for containing high purity nitrogen oxides contain from about 4% to about 20% chromium. Some typical stainless steels used in nitrogen oxide apparatus include AISI type Nos. 304, 304L, 316, 316L, 321 and 347.

In accord with a preferred embodiment of the invention, as illustrated in the drawing, typical apparatus would first be cleaned by contacting with an alkaline cleaner to remove the more apparent deposits of oil, grease, dirt and grime. The alkaline cleaner can be any suitable alkaline cleaner and may contain chelating agents, surfactants or other additives which may serve to accelerate or otherwise improve the cleaning action thereof. The alkaline cleaner may be caustic soda based, caustic potash based or any of the alkaline phosphate salts such as trisodium or disodium phosphate salts or a combination thereof typically used for such purpose. The alkaline cleaner, in most applications, generally need only be circulated through the apparatus, however, it may also be agitated, heated, mechanically scrubbed or otherwise imposed upon the apparatus to foster the cleaning activity. Upon completion of such cleaning, the apparatus is rinsed with water to remove the alkaline cleaner and any loosened dirt, oils, grime or other contaminants.

It should be understood that the water used in the water rinse of step 1, as with all of the water rinses of the process of this invention with the exception of the distilled or de-ionized water rinse, need not be of critical quality and can generally be any reasonable quality water containing acceptable levels of normal contaminants or additives found in potable quality water. In all steps utilizing a water rinse, the rinse should be continued until the chemicals used in the step have been removed. I have found it convenient to continue rinsing until the quality of the water coming from the rinsing process is the same as the quality of the water being applied, to assure that the rinse is thorough. Such method of determining the adequacy of the water rinse is hereafter referred to as quality equilibrium. It should be understood, however, that quality equilibrium of the rinse water is not a limitation of my invention but merely a convenient means to determine the adequacy of the rinse.

Upon completion of the water rinse of step 1, the apparatus is subjected to pickling using an aqueous solution of nitric acid ($HNO_3$) and hydrofluoric acid (HF). Typically, such solution will vary in concentration dependant upon whether the acids are hot or cold, the condition of the apparatus as to rust and mill scale and the time allotted to the pickling process. Generally, however, lower ratios of HF and $HNO_3$ are used to avoid undesirable etching.

The aqueous concentration should be apparent to one of ordinary skill in the art upon inspection of the apparatus to be treated and the amount of rust and mill scale contained therein. The purpose of the mixture of the two acids is to provide different but complementary action to the pickling step. The hydrofluoric acid is added principally to obtain a cleaning and etching effect, while the nitric acid accelerates the solubility of oxides, particles of metal, carbonates, etc. After pickling the apparatus is water rinsed.

Upon completion of step 2, the apparatus and/or final volumes of waste rinse water should be carefully inspected for the presence of "smut". The presence of smut, a dark particulate which typically develops on the metal surface during the chemical reaction of the pickling acids on the mill scale, can be detected by visually inspecting the metal surface, for example by wiping or otherwise, and can also be detected by filtering the final volumes of rinse water. If smut persists on the apparatus surface or in the rinse water then the apparatus should be subjected to step 2a comprising alkaline permanganate treatment and rinse. In the event smut is not detected the alkaline permanganate step is not necessary and one can proceed directly to the nitric acid passivation step 3.

The alkaline permanganate solution of step 2a, can be any suitable alkaline permanganate solution. Typically, the sodium or potassium permanganates are utilized in aqueous solution for this step directly from their preparation in strongly alkaline solution. Typically such solution will contain at least about 12% alkaline hydroxide and at least about 3% permanganate by weight. When treating apparatus which will contain nitrogen tetroxide, the use of potassium permanganate is preferred. After treatment with the alkaline permanganate the apparatus is water rinsed. The purpose of this step 2a is to remove any smut and normally this is accomplished with a single treatment and rinse. The apparatus should be again inspected for smut and if detected this step 2a can be repeated until smut is no longer detected.

Upon completion of step 2, or step 2a if appropriate, the apparatus surface is subjected to $HNO_3$ passivation in accord with step 3. The pickling process acts in part to irregularly remove or destroy the passive protective film on the apparatus surfaces as a result of contact with the HNO$_3$/HF environment, and passivation is affected by the treatment with HNO$_3$ (with or without wetting agents or other additives) which acts to form an adherent passive coating thereon. Passivation is achieved by contacting the apparatus surface with an aqueous solution of nitric acid. Typically such solution will contain from about 30% to about 50% by volume of nitric acid. Thereafter the apparatus surface is water rinsed. In instances where the apparatus has limited exposure to ambient atmosphere after completion of step 2, or step 2a as appropriate, step 3 may not be required and the process can move directly to step 4.

Upon completion of the HNO$_3$ passivation in step 3, the surface is again subjected to pickling, this time with nitrogen tetroxide solution in accord with step 4. I have found that pickling with the nitrogen oxide at this stage in the process, particularly with green nitrogen tetroxide, has the effect of loosening remaining oxides or scales without apparently destroying the effect of any prior steps. The inclusion of this step after HNO$_3$/HF pickling and HNO$_3$ passivation appears to have a controlling influence on the quality of the cleaned and passivated apparatus rendering it particularly suitable for handling high purity nitrogen oxide compounds. Green nitrogen tetroxide is an equilibrium of nitrogen tetroxide, nitrogen dioxide and nitric oxide, the solution containing not less than about 1% of nitric oxide in nitrogen tetroxide. After pickling, the surface is water rinsed and subjected to a citric acid treatment in accord with step 5.

The citric acid treatment of step 5 appears to act in fostering the removal of contaminants which had been loosened in pickling step 4 but which had not been sufficiently loosened to be removed by the water rinse. While not wishing to be bound by any theory of action, the citric acid treatment appears to break or loosen the bond between the oxide and the base metal. I have found generally that application of steps 4 and 5 effect the removal of any pertinent contaminants left after the pickling of step 2, without necessitating the repassivation of the surface. However, in the event that smut is detected after the water rinse as previously described, it is necessary to again passivate, designated as step 5a in accord with the guidelines of step 3, ending with a water rinse.

At the completion of step 5 or 5a as may be appropriate, the cleaned and passivated apparatus surface is ready for the final steps of distilled or de-ionized water rinse (step 6) and nitrogen purge (step 7). The purpose of the distilled or de-ionized water rinse of step 6 is to remove any contaminants, especially chlorides, which may be contained in the less than ideal water utilized in the water rinse of steps 5 or 5a. As with the ordinary water rinse, one method of determining the adequacy of the distilled water rinse of step 6 is continuation through quality equilibrium.

The nitrogen purge of step 7, preferably conducted at elevated temperatures, acts in the removal of residual water from step 6 and places the apparatus in cleaned and passivated condition ready for use. It has been found effective to maintain the apparatus surface under a nitrogen blanket until time for its use.

The following examples will illustrate the process of the present invention and are not to be construed as a limitation thereof.

EXAMPLE 1

A one ton capacity, stainless steel (AISI No. 304), shipping cylinder was subjected to the following process steps:

(1) The cylinder was filled with an aqueous solution of commercially available Oakite ® 24 alkaline cleaner (about 8 oz Oakite/gal water), which was maintained therein for about 15 minutes at about 180° F. The cylinder was then drained and rinsed with tap water until quality equilibrium was demonstrated.

(2) The cylinder was then refilled with an aqueous solution containing about 30 parts by volume of 70% by weight aqueous nitric acid, about 2 parts by volume of 50% by weight aqueous hydrofluoric acid and the remainder tap water. Both acids were commercial grade. The solution was maintained within the cylinder for about 15 minutes at about 150° F. The cylinder was thereafter drained and flushed with water until quality equilibrium was demonstrated. The interior surface of the cylinder was inspected for smut—none was found.

(3) The cylinder was refilled with an aqueous solution containing about 40 parts by volume of 70% by weight (commercial grade) aqueous nitric acid and about 60 parts by volume of tap water. The solution was maintained in the cylinder at about 80° F. for about 30 minutes and thereafter the cylinder was drained and rinsed with tap water to quality equilibrium. Because there was to be an indefinite delay before performing the next step, the cylinder was then purged with nitrogen gas at about 120° F. until dry.

(4) The cylinder was refilled with green nitrogen tetroxide containing about 0.5% by weight nitric oxide and maintained at about 75° F. for 30 months. The cylinder was thereafter drained, purged of fumes with gaseous nitrogen and rinsed with tap water at ambient temperature (about 75° F.) to quality equilibrium.

(5) The cylinder was refilled with an aqueous solution containing about 3% by weight citric acid at a temperature of about 160° F. The solution was agitated by means of a nitrogen stream and allowed to cool to ambient temperature (about 75° F.) over a period of approximately 24 hours. The cylinder was drained and flushed with tap water until quality equilibrium was demonstrated. The interior surface of the cylinder was inspected for smut—none was detected.

(6) The cylinder was flushed with de-ionized water at ambient temperature (about 75° F.) until quality equilibrium was demonstrated, particularly until the rinse water was chloride free.

(7) The cylinder was then purged with nitrogen gas at about 120° F. until dry. The cleaned and passivated cylinder was thereafter filled with pre-analyzed, nitrogen tetroxide. The contents were analyzed at the end of three weeks and no change in the analysis was detected.

EXAMPLE 2

A one pint capacity, stainless steel (AISI No. 304), sample container was subjected to the following process steps:

(1) The container was filled with an aqueous solution of commercially available Oakite ® 24 alkaline cleaner (about 8 oz Oakite/gal water), which was maintained therein for about 15 minutes at about 180° F. The container was then drained and rinsed with tap water until quality equilibrium was demonstrated.

(2) The container was then refilled with an aqueous solution containing about 30 parts by volume of 70% by weight aqueous nitric acid, about 2 parts by volume of 50% by weight aqueous hydrofluoric acid and the remainder tap water. Both acids were commercial grade. The solution was maintained within the container for about 15 minutes at about 150° F. The container was thereafter drained and flushed with water until quality equilibrium was demonstrated. The interior surface of the container was inspected for smut—none was found.

(3) The container was refilled with an aqueous solution containing about 40 parts by volume of 70% by weight (commercial grade) aqueous nitric acid and about 60 parts by volume of tap water. The solution was maintained in the container at about 80° F. for about 30 minutes and thereafter the container was drained and rinsed with tap water to quality equilibrium. Because there was to be an indefinite delay before performing the next step, the container was then purged with nitrogen gas at about 120° F. until dry.

(4) The container was refilled with green nitrogen tetroxide containing about 0.5% by weight nitric oxide and maintained at about 75° F. for 60 months. The container was thereafter drained, purged of fumes with gaseous nitrogen and rinsed with tap water at ambient temperature (about 75° F.) to quality equilibrium.

(5) The container was refilled with an aqueous solution containing about 3% by weight citric acid at a temperature of about 160° F. The solution was agitated by means of a nitrogen stream and maintained at a temperature of about 160° F. over a period of approximately 24 hours. The container was drained and flushed with tap water until quality equilibrium was demonstrated. The interior surface of the container was inspected for smut—none was detected.

(6) The container was flushed with de-ionized water at ambient temperature (about 75° F.) until quality equilibrium was demonstrated, particularly until the rinse water was chloride free.

(7) The container was then purged with nitrogen gas at about 120° F. until dry. The cleaned and passivated container was thereafter filled with pre-analyzed nitrogen tetroxide. The contents were analyzed at the end of 3 weeks and no change in the analysis was detected.

EXAMPLE 3

Stainless steel tubing (0.218" I.D. AISI No. 304L) was treated in accord with Example 1. Smut was detected at the end of step 2 and the tubing was filled with an aqueous solution containing about 3% by weight potassium permanganate; about 12% by weight sodium hydroxide, and the remainder tap water. The solution was maintained in the tubing at about 200° F. for about 15 minutes. The tubing was then drained and flushed with tap water until quality equilibrium was reached. The process was thereafter continued in accord with Example 1 through step 3.

The tubing was then filled with pre-analyzed nitrogen tetroxide. When analyzed after being maintained for one month at about 120° F., it showed no significant change in analysis in comparison with a companion tube which was not treated with alkaline permanganate as set forth herein.

I claim:

1. A method of cleaning and passivating a chromium containing stainless steel metal surface used in the manufacture, transport or storage of highly pure nitrogen tetroxide comprising the steps of:
    1. Cleaning said surface by contacting with an alkaline cleaner containing solution to remove fouling deposits and thereafter rinsing with water;
    2. Pickling said surface by contacting with an aqueous nitric acid/hydrofluoric acid solution to remove oxides, carbonates and mill scale, and thereafter rinsing with water;
    3. Passivating said surface by contacting with a nitric acid passivation solution and thereafter rinsing with water;
    4. Pickling said surface by contacting with green nitrogen tetroxide and thereafter rinsing with water;
    5. Cleaning said surface by contacting with a citric acid solution and thereafter rinsing with water;
    6. Rinsing said surface with distilled or de-ionized water until said surface is chloride free; and
    7. Purging said surface free of liquid with nitrogen.

2. The method of claim 1 wherein after step 2 and before step 3, said surface is contacted with an alkaline permanganate solution and thereafter rinsed with water to remove smut.

3. The method of claim 1 wherein after step 5 and before step 6, said surface is contacted with a nitric acid solution and thereafter rinsed with water to remove smut.

4. The method of claim 2 wherein after step 5 and before step 6, said surface is contacted with a nitric acid solution and thereafter rinsed with water to remove smut.

5. The method of claims 2 or 4 wherein said alkaline permanganate is potassium permanganate.

6. The method of claims 1,2,3, or 4 wherein said alkaline cleaner contains trisodium phosphate.

7. A method of cleaning and passivating a chromium containing stainless steel metal surface used in the manufacture, transport or storage of highly pure nitrogen tetroxide comprising the steps of:
    1. Cleaning said surface by contacting with an alkaline cleaner containing solution to remove fouling deposits and thereafter rinsing with water;
    2. Pickling said surface by contacting with an aqueous nitric acid/hydrofluoric acid solution to remove oxides, carbonates and mill scale, and thereafter rinsing with water;
    3. Pickling said surface by contacting with green nitrogen tetroxide and thereafter rinsing with water;
    4. Cleaning said surface by contacting with a citric acid solution and thereafter rinsing with water;
    5. Rinsing said surface with distilled or de-ionized water until said surface is chloride free; and
    6. Purging said surface free of liquid with nitrogen.

8. The method of claim 7 wherein after step 2 and before step 3, said surface is contacted with an alkaline permanganate solution and thereafter rinsed with water to remove smut.

9. The method of claim 7 wherein after step 4 and before step 5, said surface is contacted with a nitric acid solution and thereafter rinsed with water to remove smut.

10. The method of claim 8 wherein after step 4 and before step 5, said surface is contacted with a nitric acid solution and thereafter rinsed with water to remove smut.

11. A method of cleaning and passivating a chromium containing stainless steel surface of apparatus which contacts a nitrogen oxide selected from the group consisting of nitric oxide, nitrogen trioxide, nitrogen dioxide, nitrogen tetroxide and mixtures thereof comprising the steps of:
1. Cleaning said surface by contacting with an alkaline cleaner containing solution to remove fouling deposits and thereafter rinsing with water;
2. Pickling said surface by contacting with an aqueous nitric acid/hydrofluoric acid solution to remove oxides, carbonates and mill scale, and thereafter rinsing with water;
3. Passivating said surface by contacting with a nitric acid passivation solution and thereafter rinsing with water;
4. Pickling said surface by contacting with green nitrogen tetroxide and thereafter rinsing with water;
5. Cleaning said surface by contacting with a citric acid solution and thereafter rinsing with water;
6. Rinsing said surface with distilled or de-ionized water until said surface is chloride free; and
7. Purging said surface free of liquid with nitrogen.

12. The method of claim 11 wherein after step 2 and before step 3, said surface is contacted with an alkaline permanganate solution and thereafter rinsed with water to remove smut.

13. The method of claim 11 wherein after step 5 and before step 6, said surface is contacted with a nitric acid solution and thereafter rinsed with water to remove smut.

14. The method of claim 12 wherein after step 5 and before step 6, said surface is contacted with nitric acid solution and thereafter rinsed with water to remove smut.

15. The method of claims 12 or 14 wherein said alkaline permanganate solution is selected from sodium permanganate, potassium permanganate or mixtures thereof.

16. The method of claims 11 or 13 wherein after step 2 said surface is pickled in accord with said step 4 without intervening passivation in accord with said step 3.

17. The method of claims 12 or 14 wherein after said surface is contacted with alkaline permanganate and rinsed with water to remove smut, said surface is pickled in accord with said step 4 without intervening passivation in accord with said step 3.

* * * * *